Oct. 3, 1972   R. C. CORNING, JR   3,695,971
METHOD FOR FORMING TUBULAR CONTAINER BODY AND TUBULAR CONTAINER
BODY PRODUCED THEREBY
Filed Jan. 5, 1970
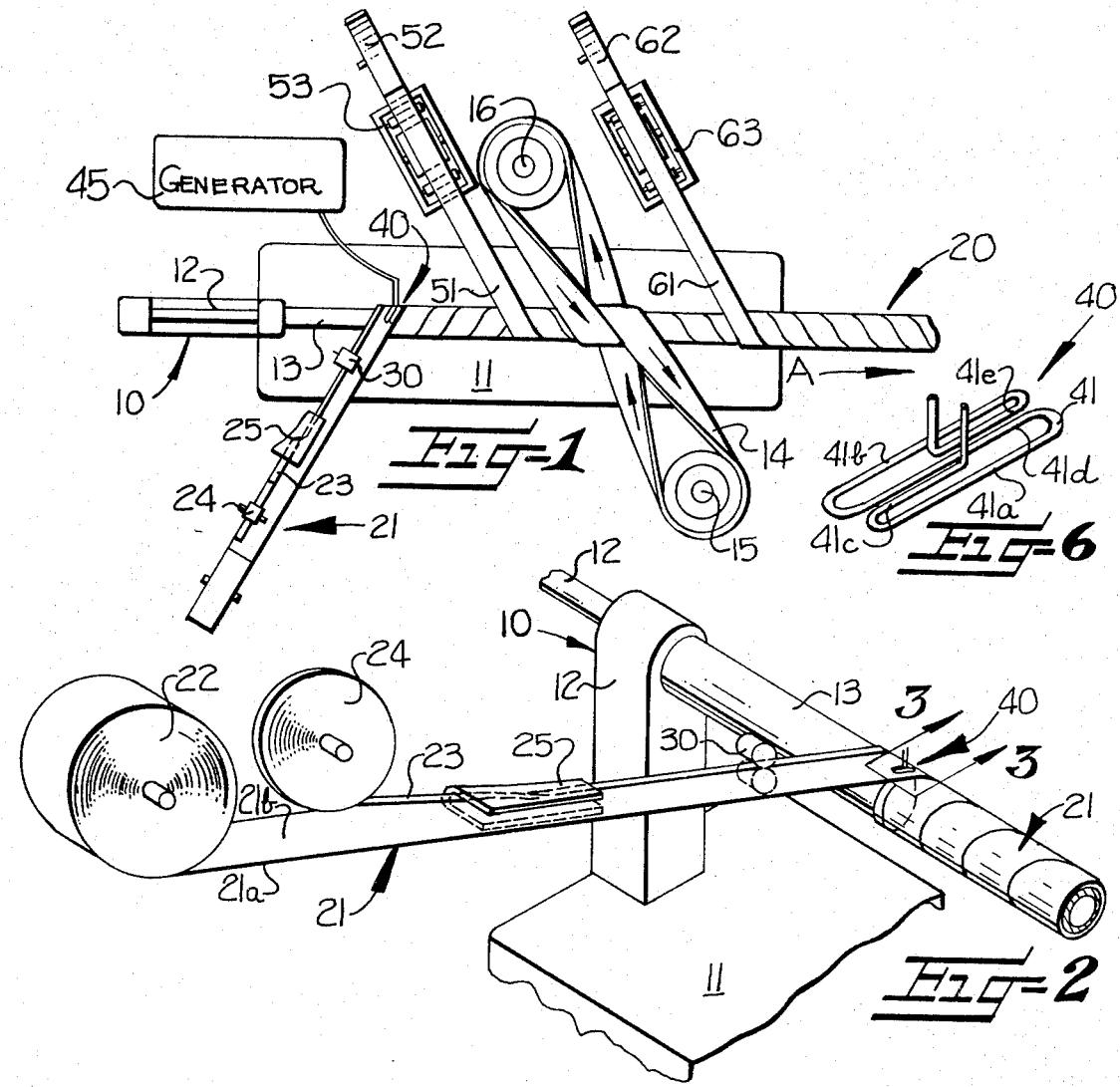
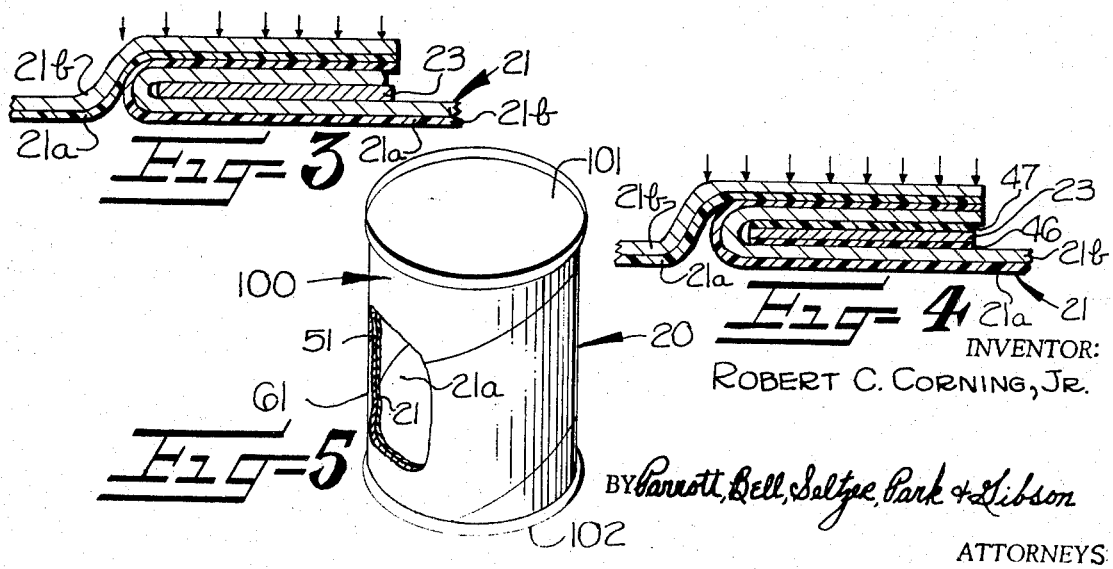
INVENTOR:
ROBERT C. CORNING, JR.
BY Parrott, Bell, Seltzer, Park & Gibson
ATTORNEYS United States Patent Office 3,695,971
Patented Oct. 3, 1972

3,695,971
METHOD FOR FORMING TUBULAR CONTAINER BODY AND TUBULAR CONTAINER BODY PRODUCED THEREBY
Robert C. Corning, Jr., Hartsville, S.C., assignor to Sonoco Products Company, Hartsville, S.C.
Filed Jan. 5, 1970, Ser. No. 609
Int. Cl. B29c 19/02; H05b 5/00
U.S. Cl. 156—275                                4 Claims

ABSTRACT OF THE DISCLOSURE

At least one ply of material having at least one marginal portion thereof coated with a heat reactive sealant is spirally wound while forming convolutions having adjacent marginal portions of adjacent convolutions in overlapping relation, preferably with one of the marginal portions being reversely folded, so that at least one of the overlapping marginal portions is coated with a heat reactive sealant. A relatively narrow strip of an electrically conductive material is positioned in close proximity to the overlapping marginal portions and is subjected to a high frequency alternating electromagnetic field which generates heat in the electrically conductive material for activating the heat reactive sealant and sealing the overlapping marginal portions of adjacent convolutions in overlapping relation.

---

This invention relates to a method for forming a tubular container body and the tubular container body produced thereby. More specifically, the invention relates to an improved method of spirally winding a tubular container body including an improved manner of activating a heat reactive sealant for sealing the overlapping marginal portions of adjacent convolutions in overlapping relation.

Conventionally, in the spiral winding of tubular bodies, plies of strip material are spirally wound and adhesively sealed in overlapping axially spaced relation with each other while forming convolutions with each ply having adjacent edges of adjacent convolutions spirally wound in abutting relation. However, in many instances it has become practical and in other instances highly desirable to spirally wind at least one ply while forming convolutions having adjacent marginal portions of adjacent convolutions in overlapping relation. This is particularly true in spirally winding tubular bodies for use as containers used to package fluid materials, semi-fluid materials or any other type of materials which are prone to cause container leakage.

With this type of tubular bodies utilizing convolutions having adjacent marginal portions in overlapping relationship, it is a popular practice to form the inside surface of the bodies from a ply comprising a laminate of aluminum foil and paper whereby the aluminum foil forms the inside surface of the container to prevent leakage through the inside wall of the container. It has also been suggested to reversely fold one marginal edge of this ply so that the internal seams of the container are formed with a foil-to-foil layer relationship to prevent leakage. These inside seams with the foil-to-foil layer relationship have been sealed by a heat reactive sealant which is applied to at least one marginal edge of the ply prior to spirally winding and is then activated by the application of heat and pressure during spirally winding to effect sealing.

Alternatively, it has been proposed in the manufacture of tubular bodies for containers to utilize a layer of moisture-impervious film in lieu of the foil layer in the laminate where a less expensive container is desired. This moisture-impervious film may be a thermoplastic resinous material. The inside seams of a container using this type of laminate may also be reversely folded to provide a film-to-film layer relationship and may be sealed with a heat reactive sealant. This heat reactive sealant may be the thermoplastic moisture-impervious film, if such is used. It has also been the practice to effect sealing of this inside seam during spiral winding by the use of heat and pressure to activate the heat reactive sealant and effect sealing.

It will be apparent that the above technique involves the direct application of heat and thus, necessitates that the heating element or wheel be held in direct contact with the surface ply for a time sufficient to activate the heat reactive sealant. Furthermore, the heat must be transmitted to the heat reactive sealant through at least one thickness of the surface ply. Since the surface ply is normally a poor conductor of heat and is being continuously wound, a relatively high level of heat is required to activate the heat reactive sealant without substantially limiting the rate at which the surface ply is wound. However, the level of heat that can be applied is limited by the material from which the surface ply is formed and thus, the rate at which the heat reactive sealant can be activated is limited which in turn limits the rate of production of such spirally wound tubular container bodies.

Thus, it is an object of the present invention to provide a method for forming a tubular container body including an improved method for activating a heat reactive sealant which does not limit the rate of production of such tubular container bodies as do heretofore known techniques and the tubular container produced thereby.

By this invention, the above object and others that will become apparent from a detailed description of the present invention are accomplished by spirally winding at least one ply of material having at least one marginal portion thereof coated with a heat reactive sealant while forming convolutions having adjacent marginal portions of adjacent convolutions in overlapping relation so that at least one of the overlapping marginal portions is coated with a heat reactive sealant. A relatively narrow strip of electrically conductive material is positioned in close proximity to the overlapping marginal portions of adjacent convolutions, and the strip of electrically conductive material is subjected to a high frequency alternating electromagnetic field to generate heat in the electrically conductive material for activating the heat reactive sealant and sealing the overlapping marginal portions of adjacent convolutions in overlapping relation.

Preferably, the tubular container body is for use in packaging fluid materials, semi-fluid materials or any other type of materials which are prone to cause container leakage and includes utilizing at least one surface ply formed of a laminate of coextensive layers of a fluid-impervious film and a fibrous material and spirally winding the surface ply so that the fluid-impervious film layer forms one of the inner and outer surfaces of the tubular container body while reversely folding over the outermost marginal portion of the surface ply so that the overlapping marginal portions of adjacent convolutions are in film-to-film relation with one another.

Some of the objects of the invention having been stated, other objects will appear as the description proceeds, when taken in connection with the accompanying drawings, in which:

FIG. 1 is a top plan view of a spiral tube winding apparatus for producing a tubular container body in accordance with the present invention;

FIG. 2 is an enlarged perspective view with portions broken away looking in the direction of arrow 2 of FIG. 1;

FIG. 3 is an enlarged sectional view taken substantially along the line 3—3 of FIG. 2;

FIG. 4 is a sectional view similar to that of FIG. 3 illustrating a modified arrangement of the present invention;

FIG. 5 is an isometric view of a container employing a tubular container body produced in accordance with the present invention; and FIG. 6 is an enlarged perspective view with portions broken away of a work coil for use in establishing a high frequency alternating electromagnetic field.

Referring more specifically to the various figures wherein like reference characters are employed to indicate like parts, there is illustrated in FIGS. 1 and 2 spiral tube winding apparatus, generally indicated at 10, by which the method of forming a tubular container body of the present invention may be carried out. The spiral tube winding apparatus 10 is conventional and as well known includes a bed 11, a head 12 to which a stationary elongate mandrel 13 has one end secured. A continuous belt 14 is provided which advances over pulleys 15 and 16 and which is looped around the mandrel 13 in the conventional manner as shown in FIG. 1 to spirally advance a tubular body 20 being formed in accordance with the invention from left to right in the direction of the arrow A (FIG. 1).

As referred to above, the present invention is preferably employed in the production of tubular bodies 20 for containers used to package fluid materials, semi-fluid materials or other types of materials which are prone to cause container leakage. Accordingly, the method of the present invention and the tubular container body produced thereby will be described for such a tubular container body 20. However, many other type tubular container bodies may be formed in accordance with the present invention.

Initially, a surface ply, generally designated at 21, comprising a laminate of coextensive layers 21a and 21b of a fluid-impervious film and a fibrous material, respectively, is unwound from a roll 22 and spirally wound on the mandrel 13 while forming adjacent convolutions with the fluid-impervious film 21a facing down against the elongate mandrel 13 and forming the inner surface of the tubular container body 20. Preferably, as the surface ply 21 is unwound from roll 22 a relatively narrow strip 23 of an electrically conductive material is unwound from a supply roll 24 and positioned in overlying relation with the fibrous material layer 21b of the surface ply 21 in close proximity to the trailing edge thereof, as shown in FIG. 2.

Thereafter, a marginal portion of surface ply 21 and the narrow strip 23 of electrically conductive material are fed through a plow 25. The plow 25 reversely folds the marginal portion of the surface ply 21 over against itself to entrap the narrow strip 23 of electrically conductive material between the fibrous material layers 21b of the folded marginal portion of the surface ply 21. In addition, the fluid-impervious film layer 21a now faces up along the folded marginal portion of the surface ply 21. Upon emerging from plow 25, the folded marginal portion of the surface ply 21 passes between a set of rollers, generally indicated at 30, which substantially flattens the folded marginal portion so as to minimize the bulge formed in the tubular container body 20 being produced.

The surface ply 21 is now passed to the mandrel 13 where it is spirally wound on mandrel 13 at an angle to the longitudinal axis of mandrel 13 with the fluid-impervious film layer 21a facing down against the mandrel 13 while forming adjacent convolutions. As illustrated in FIGS. 1 and 2, the surface ply 21 is wound with the unfolded marginal portion of each convolution overlapping the folded marginal portion of the previously wound convolution of the surface ply 21. As will be apparent, the overlapping marginal portions are wound in film-to-film layer relation with one another, the relation of the overlapping marginal portions of adjacent convolutions being best illustrated in FIG. 3.

As indicated above, the surface ply 21 comprises a laminate of coextensive layers 21a and 21b of a fluid-impervious film and a fibrous material. The laminate may be formed in accordance with conventional techniques suitable for the fluid-impervious film and fibrous material utilized. Preferably, a thermoplastic material, such as a polyolefin or the like, is utilized as the fluid-impervious film. Thermoplastic materials are reactive to heat and since the overlapping marginal portions of adjacent convolutions are in film-to-film layer relation, the thermoplastic material can additionally serve as a heat reactive sealant for sealing the overlapping marginal portions of adjacent convolutions in overlapping relation. While any thermoplastic material may be utilized, a polyolefin is preferred due to its proven comparability with most fluid or semi-fluid materials to be packaged in containers formed from tubular container bodies 20 produced in accordance with the present invention. Should it be desirable to utilize a material other than a thermoplastic material as the fluid-impervious film, at least one of the marginal portions of the surface ply 21 must be coated with a heat reactive sealant so that at least one of the overlapping marginal portions is coated with a heat reactive sealant. Paper is preferably utilized as the fibrous material.

As the unfolded marginal portions of the surface ply 21 overlaps the previously wound convolution of the surface ply 21, the overlapping marginal portions pass in close proximity to an electrical work coil, generally indicated at 40. The electrical work coil 40 comprises a copper tubing element 41 (FIG. 6) reversely bent upon itself to form two adjacent coils which include outer coil sides 41a and 41b and inner adjacent coil sides 41c, 41d and 41e. The inner adjacent coil sides 41c, 41d and 41e are arranged in parallel coincident relationship in such a manner that they form inner current paths which are additive and which are capable of establishing an electromagnetic field therearound of exceedingly high heating capabilities. The electrical work coil 40 is mounted in any suitable manner adjacent the path of the overlapping marginal portions of adjacent convolutions with the inner adjacent coil sides 41c, 41d and 41e in alignment therewith. A high frequency alternating current generator 45 is coupled to the work coil 40 and produces a high frequency alternating current in the work coil 40. The overlapping marginal portions of adjacent convolutions pass through the high frequency alternating electromagnetic field produced by the work coil 40.

While the surface ply 21 is insensitive to the high frequency alternating electromagnetic field, a current is induced in the strip 23 of electrically conductive material which in turn generates a level of heat proportional to the square of the current flow multiplied by the value of the resistance. The heat generated in the strip 23 of electrically conductive material is transferred to the heat reactive sealant for activation thereof and sealing the overlapping marginal portions of adjacent convolutions in overlapping relation. As will be apparent, heat will only be generated in the portion of the strip 23 of electrically conductive material that is subjected to the high frequency alternating electromagnetic field. Thus, the overlapping marginal portions of adjacent convolutions are sealed in overlapping relation as they pass through the high frequency alternating electromagnetic field.

The heat generated in the strip 23 of electrically conductive material is dependent upon the resistance of the electrically conductive material and the frequency and magnitude of the electromagnetic field. The value of the resistance of the strip 23 of electrically conductive material is determined by its effective length, cross-sectional area and material from which it is made. In the present instance, the material is preferably a continuous, narrow, relatively thin strip 23 of aluminum, the dimensions of the strip being chosen not only to enhance the resistive properties thereof but to equally dissipate heat throughout the overlapping region so that the heat reactive sealant may be activated to seal the overlapping marginal portions throughout the overlapping region. Reference is made to U.S. Pat. 2,946,168, issued to J. G. D. Manwaring et al. on July 26, 1960, for a complete description of a suitable work coil and generator that may be used in the present invention to accomplish the desired results. As disclosed therein, a high frequency alternating electromagnetic field of an order of magnitude of from 500 kilocycles up to 1,000 kilocycles may be produced by work coil 40. The operating characteristics of the work coil 40 and generator 45 will be chosen to generate a heat level in the strip 23 of electrically conductive material sufficient for activating the heat reactive sealant and sealing the overlapping marginal portions in overlapping relation without otherwise limiting the rate at which the surface ply 21 may be wound. The result is a film-to-film layer sealed between the overlapping marginal portions of adjacent convolutions of the surface ply 21 to form a fluid-impervious inner surface for the tubular container body 20.

If it is desirable to seal the folded marginal portion to the surface ply 21, the strip 23 of electrically conductive material may be coated on opposed sides with a layer 46 and 47, respectively, of a heat reactive sealant (FIG. 4) such as a thermoplastic material so that the heat being generated in the strip 23 of electrically conductive material also activates the layers 46 and 47 of heat reactive sealant. The layers 46 and 47 of heat reactive sealant may be applied to the strip 23 of electrically conductive material prior to its being wound on roll 24 or as the strip 23 is unrolled from roll 24.

As the surface ply 21 is spirally wound and the overlapping marginal portions of adjacent convolutions are sealed in overlapping relation, the resulting structure is axially slid along marginal 13 by belt 14. A body ply 51 of material such as paper is unwound from a roll 52 and spirally wound about the surface ply 21. As the body ply 51 is removed from the roll 52, it passes through an adhesive applicator station 53 where a coating of adhesive is applied on the surface of the body ply 51 which is to make direct contact with the previously wound surface ply 21 to enable the body ply 51 to be adhesively sealed in overlapping relation to the surface ply 21. Preferably, as shown in FIG. 1, the body ply 51 is wound at a substantially different angle than the surface ply 21 for reinforcing the surface ply 21 while forming convolutions having adjacent edges of adjacent convolutions in abutting relation.

Further along the mandrel 13, a second body or outer surface ply 61 of material such as paper is unwound from a roll 62 and spirally wound about body ply 51. As the body ply 61 is unwound from roll 62, it passes through a second adhesive applicator station 63 where a coating of adhesive is applied to the surface of the body ply 61 which is to make contact with the previously wound body ply 51, thus, enabling the body ply 61 to be adhesively sealed in overlapping relation to body ply 51. As illustrated in FIG. 1, the second body or outer surface ply 61 is wound at substantially the same angle as body ply 51 while forming convolutions having adjacent edges of adjacent convolutions in abutting relation. However, the second body or outer surface ply 61 is spirally wound with abutting edges of adjacent convolutions axially spaced from the abutting edges of adjacent convolutions of body ply 51 for strengthening purposes.

The surface ply 21, body ply 51 and second body or outer surface ply 61 are thus spirally wound and sealed in overlapping relation to produce spirally wound tubular container body 20. The tubular container body 20 is slid further along mandrel 13 in the direction of arrow A to a point (not shown) where the tubular container body 20 is cut to desirable lengths for use in forming tubular containers.

With reference to FIG. 5, a tubular container, generally indicated at 100, including a tubular container body 20 produced in accordance with the present invention, is illustrated. The tubular container body 20 has closure end caps 101 and 102, preferably formed of metal, crimped or otherwise sealed on opposed ends thereof. This tubular container 100 is for use in packaging fluid materials, semi-fluid materials or any other type of materials which are prone to cause container leakage.

Accordingly, the tubular container body 20 as heretofore described in accordance with the method of making same includes an inner surface which is fluid-impervious. More particularly, the tubular container body 20 comprises an inner surface ply 21 comprising a laminate having coextensive layers 21a and 21b of a fluid-impervious film and a fibrous material such as paper, respectively, so arranged that the fluid-impervious film layer 21a forms the inner surface of the tubular container body 20. The inner surface ply 21 is spirally wound to define convolutions having adjacent marginal portions of adjacent convolutions overlapping with the outer of the overlapping marginal portions being reversely folded over whereby the overlapping marginal portions of adjacent convolutions are in film-to-film layer relation with one another. A strip of electrically conductive material 23, preferably aluminum, is disposed between the fibrous material layers of the folded marginal portion of the inner surface ply 21. The overlapping marginal portions are sealed in overlapping relation by a heat reactive sealant positioned at least between the marginal portions for sealing the overlapping marginal portions of adjacent convolutions in overlapping relation. The electrically conductive material 23 allows the heat reactive sealant to be activated by subjecting the electrically conductive material to a high frequency alternating electromagnetic field which generates heat therein.

The folded marginal portion may be sealed to the surface ply 21 by a heat reactive sealant 46 and 47 positioned, respectively, between the electrically conductive material 23 and the fibrous material layer 21b of the folded marginal portions of the surface ply 21. The heat reactive sealant 46 and 47 will also have been activated by heat generated in the electrically conductive material 23. It will be readily apparent that if the fluid-impervious film comprises a thermoplastic material such as a polyolefin, the fluid-impervious film will also serve as the heat reactive sealant for sealing the overlapping marginal portions of adjacent convolutions in overlapping relation.

In the drawings and specification, there has been set forth a preferred embodiment of the invention, and although specific terms are employed, they are used in a generic and descriptive sense only and not for purposes of limitation.

What is claimed is:

1. A method for forming a tubular container body having an inner and outer surface comprising the steps of
spirally winding at least one surface ply having an inner surface, an outer surface and longitudinally-extending outer marginal portions and formed of a laminate of coextensive layers of a thermoplastic material and paper so that the thermoplastic material layer forms the inner surface while forming convolutions having adjacent marginal portions of adjacent convolutions overlapping and while reversely folding over one of the outer marginal portions of the surface ply so that the overlapping marginal portions of adjacent convolutions are in thermoplastic material to thermoplastic material relation with one another,
simultaneously spirally winding a relatively narrow strip of electrically conductive material and positioning the strip between the paper layers of said folded marginal portion of said surface ply and subjecting the strip of electrically conductive material to a high frequency alternating electromagnetic field to generate heat in said electrically conductive material for activating said thermoplastic material in overlapping relation and sealing said overlapping portions of adjacent convolutions in overlapping relation.

2. The method as set forth in claim 1 including utilizing a polyolefin as the thermoplastic material.

3. The method as set forth in claim 1 wherein the step of subjecting the strip of electrically conductive material to a high frequency alternating electromagnetic field includes subjecting the electromagnetic field from the innermost side of the overlapping marginal portions.

4. The method as set forth in claim 1 including utilizing aluminum as the electrically conductive material.

References Cited

UNITED STATES PATENTS

| | | | |
|---|---|---|---|
| 2,247,197 | 6/1941 | Graves | 156—195 |
| 2,315,217 | 3/1943 | Obiglio | 156—192 X |
| 2,916,399 | 12/1959 | Kurz | 156—276 |
| 2,946,168 | 7/1960 | Manwaring et al. | 219—10.53 X |
| 3,065,121 | 11/1962 | Andrews | 156—201 |
| 3,081,213 | 3/1963 | Chinn | 156—192 |
| 3,195,427 | 7/1965 | Adams | 156—195 X |
| 3,452,506 | 7/1969 | Broerman | 156—195 X |
| 3,555,976 | 1/1971 | Carter et al. | 93—80 |

CARL B. QUARFORTH, Primary Examiner

E. E. LEHMAN, Assistant Examiner

U.S. Cl. X.R.

156—195, 202; 229—3.1, 93